Figure 1:
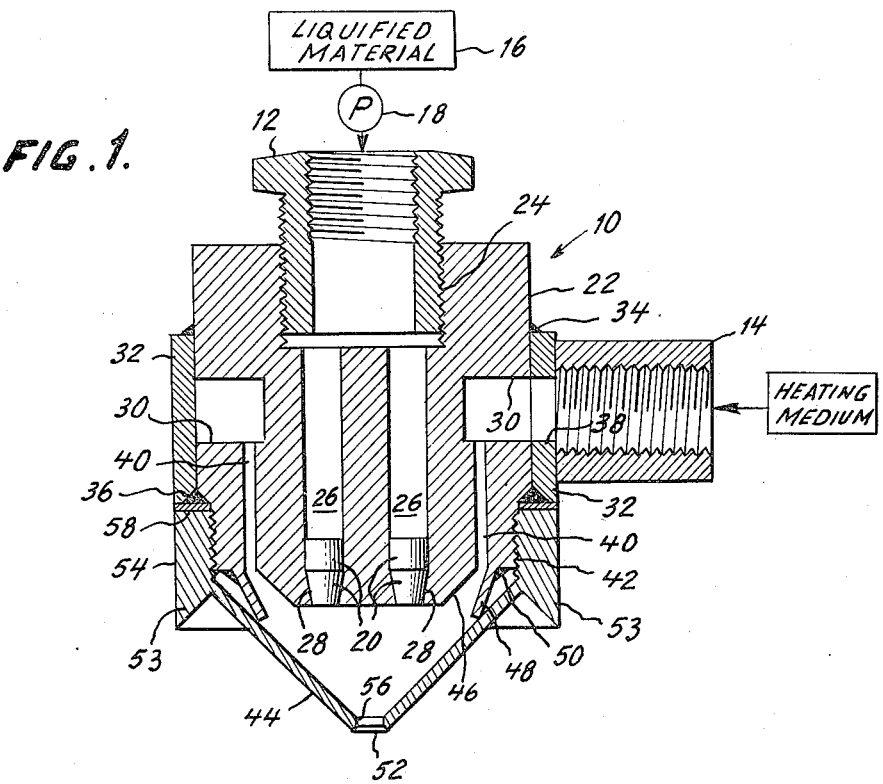
Figure 2:
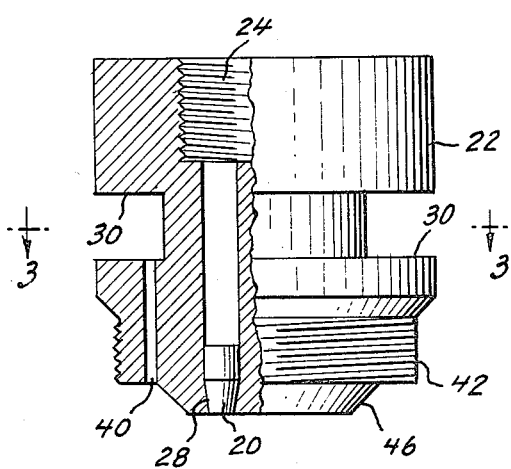
Figure 3:
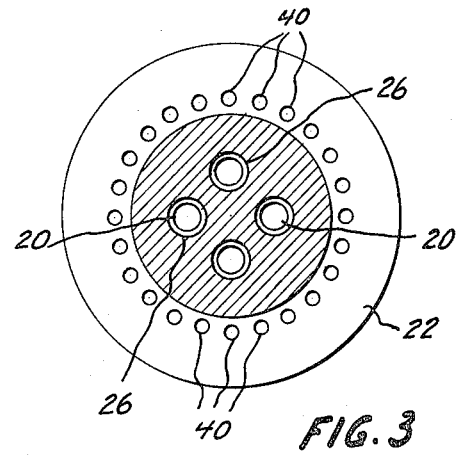

United States Patent [19]

Pitchon et al.

[11] 4,280,851

[45] Jul. 28, 1981

[54] PROCESS FOR COOKING OR GELATINIZING MATERIALS

[75] Inventors: Esra Pitchon, Flushing, N.Y.; Joseph D. O'Rourke, Dover; Theodore H. Joseph, Ellendale, both of Del.

[73] Assignee: General Foods Corporation, White Plains, N.Y.

[21] Appl. No.: 103,779

[22] Filed: Dec. 14, 1979

[51] Int. Cl.[3] ........................... C13L 1/04; C13L 1/08

[52] U.S. Cl. ........................................ 127/33; 127/28; 127/69; 127/70; 127/71; 159/4 ST; 260/112 R; 426/579; 239/403

[58] Field of Search ....................... 127/28, 29, 32, 61, 127/70, 71, 33, 69; 159/4 ST; 426/579

[56] References Cited

U.S. PATENT DOCUMENTS

| | | | |
|---|---|---|---|
| 1,450,631 | 4/1923 | Higgins | 239/403 |
| 1,983,434 | 12/1934 | Black | 127/61 |
| 2,088,606 | 8/1937 | Peebles | 127/31 X |
| 2,582,198 | 1/1952 | Etheridge | 127/28 |
| 2,919,214 | 12/1959 | Etheridge | 127/32 X |
| 2,992,141 | 7/1961 | Peebles | 127/61 |
| 3,133,836 | 5/1964 | Winfrey | 127/32 X |
| 3,272,441 | 9/1966 | Davis | 239/403 |
| 3,332,785 | 7/1967 | Kuchinke | 426/578 |
| 3,342,607 | 9/1967 | Hickey | 426/461 |
| 3,371,869 | 3/1968 | Hughes | 239/102 |
| 3,374,096 | 3/1968 | Knoch | 426/578 |
| 3,424,613 | 1/1969 | Huber | 127/28 |
| 3,474,970 | 10/1969 | Simmons | 239/404 |
| 3,477,874 | 11/1969 | Repsdorph | 127/61 X |
| 3,583,874 | 6/1971 | Germino | 426/579 |
| 3,628,734 | 12/1971 | Lindell | 239/403 |
| 3,630,775 | 12/1971 | Winkler | 127/71 |
| 3,674,555 | 7/1972 | Meyer | 127/29 |
| 3,684,186 | 8/1972 | Helmrich | 239/400 |
| 3,689,288 | 9/1972 | Duren | 426/573 |
| 3,730,729 | 5/1973 | Strommer | 426/508 |
| 3,887,135 | 6/1975 | Tamai | 239/406 |
| 4,039,691 | 8/1977 | Hildebolt | 426/511 |
| 4,141,783 | 2/1979 | Pisecky | 159/4 |
| 4,167,585 | 9/1979 | Cardis | 426/233 |

OTHER PUBLICATIONS

K. Masters, "Spray Drying: Introduction to Principles, Operational Practice and Application," 2nd Edition, pp. 595, 596, Halsted Press, New York, 1976.

"Starch: Chemistry and Technology, Industrial Aspects," vol. II, Whistler et al., eds., pp. 206–208, 238, 239, 644–646; Academic Press, New York, 1967.

"Industrial Catalog #26a; Spray Nozzles and Accessories," section on Air Atomizing Nozzles, published by Spraying Systems Co., Wheaton, Illinois, 1973.

*Primary Examiner*—Sidney Marantz

*Attorney, Agent, or Firm*—Mitchell D. Bittman

[57] ABSTRACT

A process and apparatus is provided for cooking or gelatinizng a material in an atomized state, so that there is obtained an easily dryable, uniform and finely-sized product. The material which is to be cooked is injected through an atomization aperture in a nozzle assembly to form a relatively finely-sized spray. A heating medium is also injected through an aperture in the nozzle assembly into the spray of atomized material so as to heat the material to a temperature effective to cook or gelatinize the material. An enclosed chamber surrounds the atomization and heating medium injection apertures, and defines a vent aperture positioned to enable the heated spray of material to exit the chamber. The arrangement is such that the elapsed time between passage of the spray of material through the chamber, i.e., from the atomization aperture and through the vent aperture, defines the cooking or gelatinization time of the material. The apparatus and process disclosed herein are particularly useful in preparing a novel uniformly gelatinized starch product, but also have utility in connection with cooking protein or other suitable materials.

34 Claims, 7 Drawing Figures

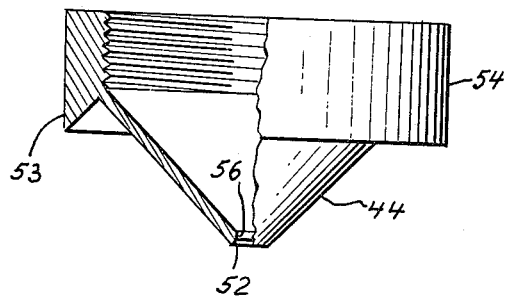
FIG. 4.
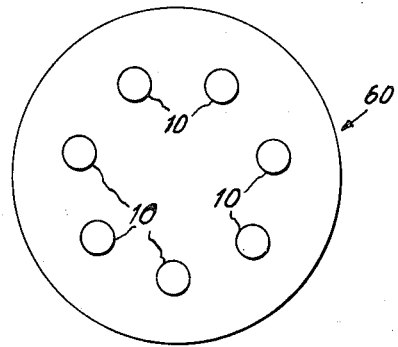
FIG. 5.
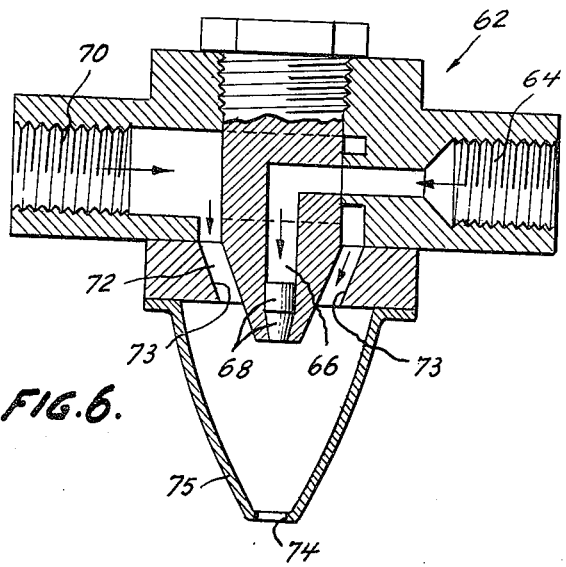
FIG. 6.
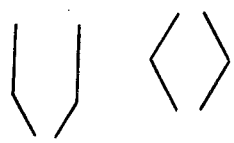
FIG. 7.

PROCESS FOR COOKING OR GELATINIZING MATERIALS

BACKGROUND OF THE INVENTION

The present invention relates to a process and apparatus for uniformly cooking materials, and the products formed thereby and, more particularly, relates to a multi-fluid spray nozzle apparatus and process for atomizing a material, such as a suitable starch, and for simultaneously cooking that material. Preferably, a material capable of gelatinization, such as a starch, is uniformly gelatinized by the process and by use of the apparatus of this invention.

The present invention is particularly applicable to the atomization and cooking or gelatinization of materials which are normally difficult to cook or gelatinize and spray dry due to the generation of high viscosities in the materials during cooking or gelatinization.

For many materials, such as starches, it is desirable to perform various chemical or physical modifications of the material when the material is in the form of a slurry, followed by drying the slurry by, for example, spray drying. When a starch, such as corn starch is in an ungelatinized (uncooked) state, then spray drying the resultant slurry is generally straight forward and may be carried out using conventional atomizers. However, when the starch is in a gelatinized (cooked) state, then spray drying the resultant slurry becomes more difficult and complex due to the increased viscosity of the starch slurry and the shearing to which the gelatinized starch granules are subjected to during atomization and spray drying. Gelatinization occurs when an aqueous starch slurry is heated beyond a critical temperature e.g., above about 65° C. for corn starch), the starch granules absorbing water and swelling resulting in a slurry with increased viscosities. For example, a slurry with 10% by weight of gelatinized corn starch generally has a viscosity of about 600 centipoises and a slurry with 15% by weight of gelatinized corn starch generally has a viscosity of about 20,000 centipoises, while a slurry with similar amounts of ungelatinized corn starch will have a viscosity similar to water (i.e., about 1 centipoise). When a gelatinized starch slurry having such high viscosities exits the cooker, then drying the starch by use of a rotary atomizer or spray nozzle in a spray dryer is unsuitable. Not only would the gelatinized starch slurry be difficult to pump and atomize due to the high viscosities generated, but the swollen starch granules would be subjected to substantial shearing action during atomization and pumping which would destroy the granule integrity of the starch. Thus, while prior art processes have pumped, atomized and spray dried slurries having up to 10% by weight of gelatinized starch, slurries of about 15% by weight or greater of gelatinized starch could not be effectively pumped, atomized or spray dried by conventional techniques while maintaining whole granule integrity.

Several types of two- and three-fluid nozzles are currently commercially available. With these nozzles, air is commonly used in the atomization process, and steam is occasionally mentioned as being an appropriate fluid for heating (not cooking) and conveying a material. Nozzles and processes of this type which are in common use or disclosed in the prior art literature may be readily found in the following United States patents:

| Patentee | U.S. Pat. No. |
| --- | --- |
| Higgins | 1,450,631 |
| Hickey | 3,342,607 |
| Knoch | 3,374,096 |
| Simmons, et al | 3,474,970 |
| Dindell, et al | 3,628,734 |
| Meyer, et al | 3,674,555 |
| Duren | 3,689,288 |
| Helmrich | 3,684,186 |
| Strommer | 3,730,729 |
| Tamai | 3,887,135 |
| Hildebolt | 4,039,691 |

However, none of these patents disclose or suggest the inventive process or multi-fluid nozzle apparatus for uniformly cooking or gelatinizing materials as described herein.

SUMMARY OF THE INVENTION

Accordingly, the present invention broadly contemplates providing an improved process and apparatus for cooking or gelatinizing a material which is normally difficult to cook and spray dry because of the formation of high viscosities during cooking, so that an easily dryable, uniformly cooked and finely-sized product is obtained thereby. The material is initially liquified or mixed in an aqueous solvent (e.g. a slurry is formed), then atomized into an enclosed chamber to form a relatively fine spray which may be uniformly cooked or gelatinized. A heating medium is interjected into the atomized material in the chamber to cook the material. The chamber contains a vent aperture to allow the heated atomized material to exit the chamber, with the size and shape of the chamber and the vent aperture being effective to maintain the temperature and moisture content of the material for a period of time sufficient to cook or gelatinize the material. In accordance with a preferred embodiment of the invention, atomization of the liquified material is effectuated in a multi-fluid nozzle through which there is conveyed the material, and steam as the heating medium is interjected into the atomized material.

In accordance with a preferred embodiment of the present invention, the material is atomized through an atomization aperture within a nozzle, and steam is interjected into the atomized material through a second aperture in the nozzle. Preferably, the heating medium (e.g. steam) is interjected through a plurality of second apertures surrounding the atomization aperture. Furthermore, the chamber which surrounds the atomization and second apertures defines a vent aperture which is preferably positioned opposite the atomization and second apertures. The elapsed time between passage of the material from the atomization aperture, through the chamber and exiting thereof from the vent aperture defines the cooking or gelatinization time of the material. The process and apparatus of the present invention not only produces a uniformly cooked or gelatinized material with a minimum of shear and heat damage, but it avoids the formation of deposits, agglomeration or clogging of the cooked or gelatinized material and provides an apparatus that is easy to maintain and repair. Further, the present invention by subjecting the atomized material to a constant environment is able to gently, quickly, and uniformly cook or gelatinize the atomized material individually while avoiding overcooking, and even more surprisingly, provide such cooking or gelatinization at relatively high starch content (e.g. 15 to 50%). The present invention is particularly suitable for use in the gelatinization of starches, but is not limited thereto and also has a wide range of applicability to materials such as protein, and other types of cookable or gelatinizable materials.

When the teachings of the present invention are applied the processing of starch materials it is desirable that the resultant gelatinized starch, for products such as instant puddings, have a particle size wherein at least 90% by weight of the particles pass through a 100 mesh U.S. Standard Screen an preberably at least 30% by weight pass through a 400 mesh U.S. Standard Screen. The practice of the present invention should result in a uniformly gelatinized starch material having good solubility and dispersibility characteristics, with a minimum of heat damage and granule breakage resulting in a maximum amount of whole precooked granules in a dry useable powder form. The gelatinized starch granules are in the form of indented spheres and upon rehydration of the starch material individual granules swell.

Further, in accordance with the teachings of the present invention, the materials may be atomized by methods other than those specifically disclosed herein with regard to the two-fluid or multi-fluid nozzle (pneumatic), such as through centrifugal forces (spinning disc), pressurized atomization, or through the employment of sonic or ultrasonic techniques. Ideally, a uniform spray of uniformly-sized, small particles is obtained to thereby ensure uniform cooking or gelatinization, granulation and drying.

Accordingly, it is a primary feature of the present invention to provide a novel method and apparatus for cooking or gelatinizing a material in an atomized state such that an easily dryable, finely-sized product is obtained thereby.

Another feature of the present invention is to provide a process and apparatus of the type described herein which is particularly suitable for uniformly granulating materials, such as starches, with a minimum of heat damage and whole granule breakage.

A more specific feature of the present invention lies in providing a process and apparatus of the type described utilizing multi-fluid nozzle wherein atomization of the material is effected by the use of at least one atomization aperture and steam as the heating medium is interjected into the atomized material spray, preferably through a plurality of apertures. More particularly, in accordance with the teachings of the present invention, a chamber surrounds the atomization and steam interjection apertures and contains a vent aperture positioned preferably opposite relative to the aforementioned apertures, with the size and shape of the chamber and the vent aperture being effective to maintain the temperature and moisture content of the material for a period of time sufficient to cook or gelatinize the material.

BRIEF DESCRIPTION OF THE DRAWINGS

The foregoing and other features and advantages of the novel method and apparatus for cooking or gelatinizing a material in accordance with the teachings of the present invention may be more readily understood by one skilled in the art, reference being made to the following detailed description of several preferred embodiments thereof, taken in conjunction with the accompanying drawings wherein identical reference numerals are used to refer to identical or similar elements throughout the several views, and in which:

FIG. 1 is an elevational sectional view illustrating details of construction of one embodiment of a two-fluid nozzle pursuant to the teachings of the present invention;

FIG. 2 is an elevational partial sectional view of only the nozzle housing shown in FIG. 1;

FIG. 3 is a horizontal sectional view of the nozzle housing taken along line 3—3 in FIG. 2;

FIG. 4 is an elevational partial sectional view of only the nozzle cap illustrated in FIG. 1;

FIG. 5 schematically illustrates a top plan view of a drying tower employing an array of two-fluid nozzles;

FIG. 6 is an elevational sectional view illustrating a second embodiment of a two-fluid nozzle constructed in accordance with the teachings of the present invention; and FIG. 7 is an elevational sectional view of other designs for the nozzle cap.

DETAILED DESCRIPTION OF THE INVENTION

Referring now in detail to the drawings, FIG. 1 illustrates an elevational sectional view of a two-fluid nozzle 10 having first and second couplings 12 and 14 attached thereto for connecting the nozzle to the fluid sources of, respectively, the slurried material and the heating medium. The first coupling 12 is provided with internal and external threads, with the latter threadedly engaging in a threaded vertically-extending bore formed in the top of the nozzle housing 22. The first coupling 12 normally connects the nozzle to a suitable supply of the liquified material 16 which, during operation, is forced through the nozzle 10 by a positive action pump 18. The second coupling 14 is internally threaded for engagement with a suitable conduit which is connected to a supply of the heating medium, which is preferably steam, but alternatively can be a heating medium such as hot gases (air), super heated steam, heated fluids, etc.

The nozzle housing 22 is shown in detail in FIGS. 1, 2 and 3, and preferably is constructed as a unitary member from a suitable material, such as steel. The housing has a threaded, vertically-extending bore 24 in its upper end which communicates with, for example, four axially-extending atomization apertures 26 symmetrically formed about the longitudinal axis of the housing. Each of the four atomization apertures terminates at its lower end in a slightly restricted portion 28 in which a spinner and orifice 20 is inserted. The spinner and orifice 20 atomizes the liquified material being pumped through the atomization aperture 26, forming a hollow cone spray of finely sized particles. Because the viscosity of materials such as starch is initially low prior to cooking or gelatinization, a pressure atomization using a spinner and orifice 20 can easily produce the finely sized particles or droplets required to obtain uniform cooking or gelatinization. In other embodiments of this invention, other atomization methods may be employed as is known in the art, such as by centrifugal forces, pressurized atomization (e.g. by steam impinging a stream of fluid), or by employing sonic or ultrasonic techniques, the criteria being that a uniform spray of finely sized particles is produced so that the material may be uniformly cooked or gelatinized. Preferably, the liquified material is atomized to produce particles within the size range of about 5 to 250 microns.

An annular groove (manifold) 30 is machined around the outer circumference of the housing, approximately midway of its height, to form a manifold for the heating medium, e.g., steam, being introduced to the nozzle through coupling 14. A cylindrical band 32 having an inner diameter matching the outer diameter of the nozzle housing 22 is positioned around the annular manifold 30 to enclose it and seal it, and the cylindrical band is secured to the housing by two ring-like fillet welds, one 34 at its top surface and the second 36 at its bottom surface. A hole 38 is drilled through the cylindrical band 32 at the location of the second coupling 14 to allow the heating medium to flow through the coupling into the manifold 30. A plurality of heating medium interjection apertures 40 are drilled axially and concentrically around the nozzle housing 22, such that the plurality of heating medium interjection apertures 40 communicates with the annular manifold 30 and extends to the lower portion of the nozzle housing 22, whereat the heating medium is interjected into and passes in a substantially circular pattern around the atomized material being sprayed from the atomization apertures 26. The interjected heating medium acts to heat the atomized material to the desired cooking or gelatinization temperature, as well as assist in the atomization of the material exiting the nozzle vent aperture 52.

In the preferred embodiment, twenty-four heating medium (preferably steam) interjection apertures 40 surround four atomization apertures 26, all of which are symmetrically placed about the longitudinal axis of the nozzle. Obviously, in other embodiments, other arrangements and numbers of atomization and heating medium interjection apertures may be utilized.

The lower portion of the nozzle housing 22 has a reduced diameter portion 42 having external threads formed therearound to provide a means of threaded attachment to a nozzle cap 44. A frustoconical surface 46 is provided on the lower edge of the central portion of the nozzle housing to provide for deflection of the heating medium (e.g. steam), in a manner as will be explained in greater detail hereinbelow.

As illustrated in FIG. 1, a small ring 48 having interior and exterior frustoconical surfaces is attached, as by a fillet weld 50, to the bottom of the threaded portion 42 of the nozzle housing to thereby deflect the heating medium (e.g., steam), injected through the heating medium interjection apertures 40, radially inwardly into the spray of atomized material. The lower portion of the frustoconical ring 48 contacts the inner surface of a frustoconical section of the nozzle cap 44, with the inner surface of the nozzle cap 44 also assisting in redirecting the annular flow of interjected heating medium into the spray of atomized material and toward a nozzle vent aperture 52 formed centrally in the lower end of the nozzle cap.

As best illustrated in FIG. 4, the nozzle cap 44 includes an upper annular portion 54 having internal threads formed therein for attachment with the external threads formed on the lower portion 42 of the nozzle housing. The inner frustoconical surface of the nozzle cap extends downwardly and inwardly, terminating in the nozzle vent aperture which has a rounded inner lip at 56. Extending below the upper annular portion 54, the nozzle cap includes an annular lip 53 with a frustoconical surface of the inner portion thereof extending downwardly and outwardly which aids in preventing any substance from dripping down the exterior surface of the nozzle cap to clog the nozzle vent aperture 52.

The fillet weld 36 at the bottom of cylindrical band 32 is machined smooth, and a gasket 58 is positioned between the nozzle housing and the nozzle cap to seal the nozzle. The arrangement is such that the nozzle cap may be unscrewed from the nozzle housing to provide access to the interior of the housing for cleaning or servicing thereof.

The enclosed area between the inner surface of the nozzle cap 44 and the lower surface of the nozzle housing 22 forms the enclosed chamber wherein the heating medium is interjected into the atomized material to heat the material to a temperature effective to cook or gelatinize the material. The size and shape of the chamber and the size of the vent aperture is effective to maintain the temperature and moisture content of the material for a period of time sufficient to cook or gelatinize the material to the desired degree. Stated another way, the size and shape of the chamber and the size of the vent aperture is effective to maintain a temperature and a moisture content within the chamber and a period of time for passage of the atomized material through the chamber sufficient to cook or gelatinize the material. The period of time which it takes for the material to pass from the atomization aperture 26 and through the vent aperture 52 (i.e., to pass through the chamber) defines the cooking or gelatinization time of the material. The major portion of the cooking or gelatinization of the material occurs within the chamber, however, a minor amount of cooking or gelatinization may occur upon exit of the material from the chamber (from the vent aperture) which is due to the heat and moisture the material is subjected to within the chamber. Thus, the cooking or gelatinization time as herein defined includes the cooking or gelatinization which occurs within the chamber, as well as the cooking or gelatinization which occurs upon exit of the material from the chamber which is due to the maintenance of the material at a temperature and moisture content effective to cook or gelatinize the material. Accordingly, the nozzle cap 44 (therefore the chamber size and shape) and the size of the vent aperture 52 can be adjusted to control the temperature and moisture content in the chamber and the residence time of the material in the chamber and hence the cooking or gelatinization conditions and time to which the material is subjected.

FIG. 5 is a top view of a spray drying tower 60, illustrating schematically an array of two-fluid nozzles 10 provided therein. FIG. 5 illustrates one embodiment of how a plurality of nozzles may be combined in one spray drying tower to provide the desired volume throughput of cooked or gelatinized material. A spray drying tower can be approximately twelve feet in diameter and thirty feet in height, and in another embodiment, seven nozzles can be positioned at the top thereof spaced apart at approximately two-foot intervals, with a further nozzle being arranged at the center.

FIG. 6 illustrates an elevational sectional view of second embodiment of a two-fluid nozzle 62 constructed pursuant to the teachings of the present invention. In this embodiment of the invention, the liquified material to be processed enters the nozzle through a conduit 64 provided in its right-hand portion (as viewed in FIG. 6) and is first directed radially inwardly and then axially downwardly through an atomization aperture 66 formed in the central portion of the nozzle 62 into a spinner and orifice 68 arranged in the lower portion of the atomization aperture 66. The spinner and orifice 68 assists in atomizing the material so as to convert the material into a fine spray. The viscosity of the liquified material is initially low, and this allows for the atomization of the material by the small orifice and spinner, and results in the production of a relatively fine spray. Steam (or other heating medium) enters through a conduit 70 in the left-hand portion of the nozzle (as viewed in FIG. 6), and enters an annular manifold 72 positioned about the longitudinally-extending atomization aperture 66. The annular manifold is gradually reduced in diameter towards its lower end forming a heating medium interjection aperture 73. From the heating medium interjection aperture 73 the steam is interjected into the atomized material being sprayed from the atomization aperture 66.

A nozzle cap 75 encloses the atomization and heating medium interjection apertures (66 and 73 respectively), the nozzle cap 75 containing a vent aperture 74 positioned opposite the atomization and heating medium apertures (66 and 73 respectively). The enclosed area between the nozzle cap 75 and the atomization and heating medium apertures (66 and 73 respectively) forms the enclosed chamber wherein the heating medium is interjected into the spray of atomized material to cook or gelatinize the material. As with the previous nozzle illustrated in FIG. 1, the size and shape of the chamber and vent aperture is effective to maintain the temperature and moisture content of the material for a period of time sufficient to cook or gelatinize the material. The period of time for the passage of the atomized material through the chamber defines the cooking or gelatinization time of the material. The enclosed chamber maintains a desired temperature and moisture content enabling the material to be uniformly cooked or gelatinized therein.

While FIGS. 1, 4 and 6 illustrate preferred embodiments for the nozzle cap design and hence the preferred size and shape of the enclosed chamber, other designs are also comprehended by the instant invention, as illustrated in FIG. 7. The design of the nozzle cap and the positioning, size and number of vent apertures can be adjusted to obtain the desired cooking or gelatinization conditions (temperature, vapor pressure or moisture content) and time. Care must be taken in designing the nozzle cap and positioning the vent so that the atomized material will be uniformly mixed with the heating medium and substantial clogging of the vent aperture is avoided.

As previously mentioned with regard to the various embodiments, the nozzle components may be constituted of metal, such as stainless steel, which is suitable for the processing of food products. Also, in some embodiments, the internal surfaces of the nozzle may be coated with Teflon (registered trademark) to further ensure that the material does not agglomerate therein and form deposits on the interior surfaces of the nozzle, thereby resulting in clogging thereof.

In various designs of a two-fluid nozzle, several parameters may be varied from embodiment to embodiment, such as the number of injection apertures, and the degree of atomization. For instance, if the throughput of liquified material is constant or unchanged, one relatively large atomization aperture, as opposed to several small atomization apertures, should result in a cooked or gelatinized material having a larger average particle size.

The distance between the atomization aperture and the nozzle vent aperture is important, as that distance determines the time over which the material is cooked or gelatinized. In the illustrated embodiment, the distance between the atomizing aperture and the nozzle vent aperture has optimally been selected to be approximately 0.875 inches (22 mm) for a material such as starch, a nominally optimal value when considering other parameters in the system and the products processed therein. Preferably, the distance between the atomizing aperture and the nozzle vent aperture is within the range of about 0.125 inches (13 mm) to 1.5 inches (38 mm), however, that distance may be varied from a smaller distance to a larger distance in other operational models. The larger distances result in a greater degree of cooking or gelatinization of the materials, and may conceivably result in overcooking and fouling of the nozzle cap and nozzle vent aperture with caked and agglomerated materials whereas, contrastingly, the shorter distances may not provide for a sufficient cooking or gelatinization time. However, this is all dependent on the degree of cooking or gelatinization desired for the particular material with the size of the chamber and hence the time the material spends in the chamber being adjusted accordingly. By cooking, what is meant is that the material is prepared for subsequent use by subjecting it to the action of heat and moisture (or other vapor pressure) for a period of time, with gelatinization being a category of cooking in that a suitable material by subjecting it to the action of heat and moisture over time is converted into a gelatinous form (e.g., by starch granules absorbing water and swelling).

Other apparent variables in the practice of the present invention are the temperature and vapor pressure (moisture content) within the chamber which is controlled, by the size and shape of the chamber and vent aperture, as well as the temperature, pressure and flow rates of the heating medium (e.g., steam, super heated steam, heated gases, heated fluids, etc.), concentration and flow rate of the liquified material, etc. In the present invention, steam supplied at a pressure above 50 psig (3.5 Kg/cm$^2$) would appear to be adequate to result in cooking or gelatinization of a material such as starch. The nozzle of the disclosed embodiment has been utilized with steam pressures varying from 90 to 160 psig (6.3 to 11.3 Kg/cm$^2$), although either higher or lower steam pressures could also be employed. The steam provides temperatures within the chamber in the range of from about 300° to 340° F. (150° to 170° C.), although either higher or lower temperatures may also be utilized depending upon other variables (pressure of steam, type of heating medium, size and shape of chamber and vent aperture, solids content, feed rate of liquified material, proportion of heating medium to liquified material, gelatinization or cooking temperature, type of material, additives or modifications of material, etc.). Generally, a temperature of 50° C. to 300° C. within the chamber can be utilized to gelatinize starch, although preferably the chamber temperature is maintained within the range of 120° C. to 200° C.

Another variable which may be changed to control the temperature and thus the cooking or gelatinization of the material is the proportion of heating medium (e.g., steam) to liquified material with the proportion, for example, for starch being preferably controlled to within the range of 0.5 to 3 (part by weight steam/part by weight starch slurry). Operation of the invention is affected by the size of the nozzle vent aperture, with it generally being desirable to maintain a greater area for the heating medium interjection apertures than for the nozzle vent aperture, such that the chamber is maintained at a temperature and moisture content (vapor pressure) which enables the material to be cooked or gelatinized to the desired degree. Preferably the size of the nozzle vent aperture is within the range of about 0.125 inches (3 mm) to 0.5 inches (13 mm), however, this size may be varied from a smaller to a larger size in other operational models depending upon the temperature and moisture content desired as well as the flow rates of the heating medium and atomized material.

Another variable which may be altered in different nozzle designs is the direction in which the heating medium is interjected into the spray of atomized material, with it being possible to direct the interjected heating medium directly toward the nozzle vent aperture, or deflect it off the side wall of the nozzle cap towards the vent aperture, or direct the interjected heating medium tangentially to the axis of the chamber. The enclosed chamber should be sufficiently large and the heating medium should be interjected so as to mix the heating medium with the spray of atomized material before the material makes contact with the chamber wall, thus insuring a uniform and desired degree of cooking or gelatinization of the material.

Generally, the material must be liquified or mixed with a solvent to enable it to be pumped and atomized. By liquified, what is meant is that the material is reduced to a liquid state (flows freely) by mixing the material with a solvent, which may be carried out by forming a solution or a slurry (includes suspensions, etc.). While water is the preferred solvent other solvents such as alcohol, acetone etc. or combinations thereof may also be employed. When the material is starch, the starch is liquified or mixed with an aqueous solvent by forming a slurry which may comprise at least 15% starch, preferably 35 to 45% starch by weight, as compared to prior art spray drying processes which generally have a maximum solids content of about 10% of gelatinized starch.

The starch may be derived from any suitable source such as corn, sago, wheat, tapioca, rice, potatoes, sweet potatoes or waxy maize. Further, it may be in a raw unmodified state, or it may have been previously modified in any desired manner, as for example, by hydrolysis, oxidation, dextrinization, esterification, etherification, etc. or any combination of these treatments. As well, a material such as a starch may be combined or slurried with other ingredients, e.g., emulsifiers (mono and diglycerides, polysorbates, etc.), colors, flavors, carbohydrates (e.g. sugars), proteins, fats, processing aids, etc. followed by atomization and gelatinization or cooking by the process of this invention. In the treatment of starch from whatever source, it is important that the starch is capable of being gelatinized, preferably in an ungelatinized state, and in the form of its original unbroken granules, and that it remain in that form throughout its derivation process prior to being atomized and gelatinized by the present invention. Moreover, the material feed temperature may range from above freezing, to ambient, to 140° F. (60° C.), and the feed pH may range from 2 to 12 (preferably 5 to 7). The starch may be uniformly gelatinized by the present invention to any desired degree, but preferably the starch is uniformly substantially completely gelatinized, as measured under a polarized light by the starch losing its birefringent patterns.

The present invention is able to subject the individual particles of the atomized material to a constant environment and gently, quickly and uniformly cook or gelatinize the atomized material while avoiding overcooking. Thus, the gelatinized starch granules obtained are uniformly swelled to the maximum extent, while maintaining whole granule integrity without the need of heavy chemical modification and with a minimum of granule breakage, or heat damage.

The present invention produces a unique spray dried gelatinized starch heretofore unattainable by conventional processes. The dried gelatinized starch contains starch granules in the form of indented spheres. By indented spheres it is meant that the gelatinized spherical starch granules during drying lose moisture causing the partial collapse of the sphere which forms at least one dimple or indentation on the surface of the sphere. The starch granules are uniformly gelatinized and possess at least a majority of granules which are whole and unbroken, and preferably approximately 100% whole and unbroken granules. The starch of the present invention contains a greater degree of whole, unbroken granules than a starch prepared by conventional spray drying processes with similar degrees of modification (chemical or physical) of the starch. Uniquely, the present invention enables the control of the particle size of the dried starch without subsequent grinding obtaining a desired size of agglomerates of starch granules or even individual whole starch granules, without excessive shear and breaking of the granules. The starch agglomerates formed are loosely bound starch granules and upon hydration, the agglomerates break up and disperse into the individual granules which swell. This property is paramount for products such as instant puddings in order to obtain upon hydration a smooth, uniform, homogeneous, continuous and non-grainy texture.

A comparison with conventional gelatinization and drying processes demonstrates the novelty of the gelatinized spray dried starch prepared by the process of the present invention. Drum drying produces sheets of gelatinized starch which are subsequently ground to a desired particle size. The drum dried starch flakes are in agglomerate form and posses a high degree of broken granules and free starch due to the grinding. The drum dried agglomerates (fractured sheets or flakes) swell and break up slightly upon hydration. Conventional spray drying of gelatinized starch must be carried out at extremely low concentrations (less than 10%) to enable the starch slurry to be pumped and atomized, thus rendering the process economically unfeasable. Even lower concentrations must be employed if whole granules are desired, as conventional methods require subjecting fragile swollen (gelatinized) granules to the sheer associated with atomization. The conventional spray dried starch is in the form of tightly bound agglomerates due to the free starch from the sheared granules binding the agglomerates together. Upon hydration, in general, the agglomerates swell and stay bound together, which could result in a grainy texture in products such as instant puddings. As well, in conventional spray drying of gelatinized starch one cannot control the particle size of the dried starch to obtain fine starch particles (small agglomerates or individual whole granules) without excessive shear and breaking of the granules. Further, with conventional gelatinization processes the uniformity of gelatinization cannot be effectively and consistently controlled.

In comparison, with the same level of chemical modification of the starch, the present invention is able to produce a starch with a greater percent of whole granules than that obtained by conventional spray drying of gelatinized starch. Further, the dried starch prepared by the present invention requires a lower level of chemical modification and even no chemical modification to obtain whole granules and a dried starch which upon hydration posses desireable appearance (high sheen) and textural characteristics (smooth, continuous, homogeneous and non-grainy), which conventionally required higher levels of chemical modification to obtain. The identified differences between conventionally spray dried gelatinized starch and the dried starch prepared by the present invention become even more pronounced the lower the level of chemical modification of the starch.

After the material is cooked or gelatinized by the method of the present invention the material is then preferably dried, preferably in a spray drying tower although other drying techniques, such as belt dryers or flash dryers, may also be employed.

The teachings of the present invention also have applicability in the processing of other materials, such as proteins, dextrins or even other non-food materials, with the resultant advantage that the protein or dextrin may receive minimal shearing or heat treatment, and result in a product having good dispersibility and solubility characteristics.

While several embodiments of a process and apparatus have been disclosed for cooking or gelatinizing a material in an atomized state so that there is obtained thereby an easily dryable, uniform and finely-sized product, the teachings of the present invention as set forth herein will suggest many alternative embodiments and variations to those of ordinary skill in the art.

EXAMPLE I

Seven two-fluid nozzles constructed as illustrated in FIG. 1 were arranged in a spray drying tower as illustrated in FIG. 5. The atomization apertures contained a spinner and orifice having a spinner with 4 grooves of 0.020 inches (0.51 mm) wide and 0.035 inches (0.89 mm) deep and having an orifice size of 0.016 inches (0.41 mm). The distance between the atomization apertures and the nozzle vent aperture was 0.875 inches (22 mm), with the vent aperture having a diameter of 0.25 inches (6.4 mm). Ungelatinized tapioca starch cross-linked with about 0.01% of phosphorus oxychloride (by weight of the starch) was slurried in water at a pH of 6 and at a level of 35% solids by weight.

The slurry at a temperature of 69° F. (21° C.) was pumped into each nozzle at a rate of 1.2 gal/min (4.6 liters/min) per nozzle, with steam as the heating medium at a pressure of 150 psig (10.5 Kg/cm$^2$) being pumped into each nozzle at an estimated flow rate of 380 lbs/hr (172 Kg/hr) per nozzle. The temperature within the nozzle chamber is estimated to be approximately 310° F. (155° C.). The spray drying tower had an inlet temperature of about 300° to 370° F. (about 150° to 195° C.) and an outlet temperature of about 175° to 205° F. (about 80° to 95° C.).

As the starch was ungelatinized, the slurry flowed readily and was easily pumped into the nozzle where the starch underwent gentle, quick and uniform gelatinization by being subjected to high temperatures in the presence of moisture for an amount of time sufficient to gelatinize the starch granules. The resultant starch possessed approximately 80% whole granules and was uniformly and substantially completely gelatinized (birefringent patterns lost under polarized light) while avoiding overcooking with a minimum of heat damage or granule breakage. On exiting the nozzle vent aperture, the resultant gelatinized starch was in a finely-sized atomized state and was easily dried in the spray drying tower. The dried pregelatinized starch had a mesh size wherein about 80% by weight of the starch passed through a 230 mesh U.S. Standard Screen an was readily useable, as is, in products such as instant pudding mixes. When used in an instant pudding mix the resultant prepared pudding had the desireable texture (smooth, continuous, homogeneous, non-grainy), appearance (high sheen), mouthfeel and viscosity as is characteristic of puddings prepared with heavily modified starches (e.g. cross-linked and substituted). The dried preglatinzed starch granules were in the form of indented spheres and the granules were loosely bound as agglomerates, which upon hydration separated into individual granules which swelled.

EXAMPLE II

Seven two-fluid nozzles constructed as illustrated in FIG. 6 were arranged in a spray drying tower as illustrated in FIG. 5. The atomization aperture contained a spinner and orifice having a spinner with 4 grooves of 0.025 inches (0.64 mm) wide and 0.048 inches (1.22 mm) deep and having an orifice size of 0.042 inches (1.07 mm). The distance between the atomization aperture and the nozzle vent aperture was 0.875 inches (22 mm), with the vent aperture having a diameter of 0.25 inches (6.4 mm). Ungelatinized tapioca starch cross-linked with about 0.01% of phosphorus oxychloride and hydroxypropylated with about 8% of propylene oxide (by weight of the starch) was slurried in water at a pH of 6 and at a level of 40% solids by weight.

The slurry at a temperature of 69° F. (21° C.) was pumped into each nozzle at a rate of 1.2 gal/min (4.6 liters/min) per nozzle, with steam as the heating medium at a pressure of 150 psig (10.5 Kg/cm$^2$) being pumped into each nozzle at an estimated flow rate of 380 lbs/hr (172 Kg/hr) per nozzle. The temperature within the nozzle chamber is estimated to be approximately 310° F. (155° C.). The spray drying tower had an inlet temperature of about 300° to 370° F. (about 150° to 195° C.) and an outlet temperature of about 175° to 205° F. (about 80° to 95° C.).

As the starch was ungelatinized, the slurry flowed readily and was easily pumped into the nozzle where the starch underwent gentle, quick and uniform gelatinization by being subjected to high temperatures in the presence of moisture for an amount of time sufficient to gelatinize the starch granules. The resultant starch possessed approximately 100% whole granules which were uniformly and substantially completely gelatinized while avoiding overcooking with a minimum of heat damage or granule breakage. On exiting the nozzle vent aperture, the resultant gelatinized starch was in a finely-sized atomized state and was easily dried in the spray drying tower. The dried pregelatinized starch granules had a mesh size wherein about 80% by weight of the starch passed through a 230 mesh U.S. Standard Screen and was readily useable, as is, in products such as instant pudding mixes. When used in an instant pudding mix the resultant prepared pudding had the desireable texture (smooth, continuous, homogeneous, non-grainy), appearance (high sheen), mouthfeel and viscosity as is characteristic of puddings prepared with heavily modified starches. The dried pregelatinized starch granules are in the form of indented spheres and the granules were loosely bound as agglomerates, which upon hydration separated into individual granules which swelled.

EXAMPLE III

The following samples of raw ungelatinized tapioca starch were chemically modified as in Examples I and II, then conventionally gelatinized (cooked) followed by conventional spray drying to enable a comparison to be made between a conventional cooking and spray drying process versus the method of uniformly cooking a starch by the process of the instant invention. Sample I of raw ungelatinized tapioca starch was cross-linked with about 0.01% of phosphorus oxychloride (as in Example I), then cooked at 188° F. (87° C.) for about 4 minutes to gelatinize the starch, followed by cooling to about 125° F. to 140° F. (50° C. to 60° C.). Sample II of raw ungelatinized tapioca starch was cross-linked with about 0.01% of phosphorus oxychloride and hydroxypropylated with about 8% of propylene oxide (as in Example II), then cooked at 170° F. (75° C.) for about 4 minutes to gelatinize the starch, followed by cooling to about 125° F. to 140° F. (50° C. to 60° C.). Each sample was microscopically examined to ensure that all the granules were swollen while maintaining 100% whole granules.

Each gelatinized starch sample at a solids level of about 1.5% was then conventionally spray dryed through a standard pressure nozzle (ST type) manufactured by Spraying Systems Co (Wheaton, Ill.). The nozzle contained an orifice with a diameter of 0.020 inches (0.51 mm) and a spinner with 4 grooves of 0.020 inches (0.51 mm) wide and 0.031 inches (0.79 mm) deep. The samples of gelatinized starch slurries were pumped through the pressure nozzle at a pressure of 300 to 350 psig (20 to 25 Kg/cm$^2$) and at a rate of about 1.5 pounds (0.7 Kg) of dry starch per hour into a spray drying tower having an inlet temperature of about 375° F. (190° C.) and an outlet temperature of about 190° F. (90° C.).

Each spray dried starch sample formed tightly bound agglomerates which upon hydration swelled as agglomerates and did not break up into individual granules. Individual dried whole granules could not be consistently obtained since when finer atomization was attempted excessive shear occurred, resulting in an inordinate percent of broken granules. As well, gelatinized starch slurries with higher percents of solids could not be effectively spray dried due to the excessive shear resulting in an inordinate percent of broken granules. The spray dried starch of Sample I possessed approximately 40 to 50% by weight of whole granules (in comparison to the starch of Example I with 80% whole granules), and the spray dried starch of Sample II possessed approximately 75% by weight of whole granules (in comparison to the starch of Example II with 100% of whole granules).

When each sample was employed in an instant pudding composition then hydrated and compared to the counterparts in Examples I and II, the puddings of Samples I and II had less sheen and were grainy and non-continuous. This texture and appearance in Samples I and II were the result of agglomerates swelling leaving large voids, as compared to Examples I and II where individual starch granules swelled and were more widely dispersed.

What is claimed is:

1. A method of uniformly cooking a material comprising:
    (a) mixing a material in an aqueous solvent;
    (b) atomizing the mixture into an enclosed chamber;
    (c) interjecting a heating medium into the atomized mixture in the enclosed chamber to cook the material, said chamber containing a vent aperture positioned to enable the atomized mixture to exit the chamber, the size and shape of the chamber and the vent aperture being effective to maintain the temperature and moisture content of the material for a period of time sufficient to cook said material.
2. Method of claim 1 further comprising drying said cooked material.
3. Method of claim 1 wherein an aqueous slurry is formed by mixing the material in water.
4. Method of claim 3 wherein the material is a starch capable of being gelatinized and the period of cooking time of the starch is sufficient to gelatinize the starch.
5. Method of claim 4 wherein the starch slurry contains at least 15% starch by weight.
6. Method of claim 5 wherein the starch is an ungelatinized starch.
7. Method of claim 5 wherein the starch is a chemically modified ungelatinized starch.
8. Method of claims 6 or 7 wherein the starch is uniformly substantially completely gelatinized to a point where the birefringent patterns of the starch are lost under polarized light.
9. Method of claim 4 wherein the starch slurry contains from 35 to 45% starch by weight.
10. Method of claim 4 wherein the starch slurry is atomized to a particle size within the range of 5 to 250 microns.
11. Method of claim 4 wherein the temperature within the chamber is maintained within the range of 50° C. to 300° C.
12. Method of claim 5 wherein the temperature within the chamber is maintained within the range of 120° C. to 200° C.
13. Method of claim 12 wherein the proportion of part by weight of steam as the heating medium to part by weight of starch slurry is within the range of 0.5 to 3.
14. Method of claims 1 or 4 wherein the heating medium is steam.
15. Method of claim 14 wherein the mixture is atomized by pumping the mixture into a nozzle and through a first atomization aperture in the nozzle.
16. Method of claim 15 wherein the heating medium is interjected into the atomized material through a second aperture in said nozzle.
17. Method of claim 16 wherein the heating medium is interjected through a plurality of second apertures surrounding said first atomization aperture.
18. Method of claim 17 wherein the mixture is atomized through a plurality of atomization apertures.
19. Method of claim 17 wherein the vent aperture of the chamber is positioned opposite said first and second apertures.
20. Method of claim 19 wherein the distance between the first atomization aperture and the vent aperture is within the range of about 0.5 inches to 1.5 inches and the vent aperture has the diameter within the range of 0.125 inches to 0.5 inches.
21. Method of claim 20 wherein the total area for the second heating medium interjection apertures is greater than tha area of the vent aperture.
22. Method of claim 1 wherein the material is a protein.

23. Method of claim 2 wherein the cooked atomized material is dryed in a spray drying tower.

24. Method of claim 1 wherein the heating medium is a heated gas.

25. Method of claim 1 wherein a solution is formed by mixing the material in a solvent.

26. A spray dried pregelatinized starch product comprising:
uniformly gelatinized starch granules in the form of indented spheres, at least a majority of said granules being whole and unbroken, said starch granules being in the form of loosly-bound agglomerates or individual granules, and in which the dried starch product upon hydration results in individual swollen granules.

27. Starch product of claim 26 wherein the starch is uniformly fully gelatinized.

28. Starch product of claim 27 wherein approximately 100% of the starch granules are whole and unbroken.

29. Starch product of claims 27 or 28 wherein at least a majority of the starch granules by weight are in the form of of loosly-bound agglomerates which upon rehydration break up and disperse resulting in individual swollen granules.

30. Starch product of claim 27 wherein at least a majority of the dried starch product by weight is individual whole granules.

31. Starch product of claim 27 wherein the starch is a chemically modified starch.

32. Starch product of claim 31 wherein the starch is chemically modified by at least one member of the group consisting of hydrolysis, oxidation, dextrinization, esterification and etherification.

33. Starch product of claim 27 wherein the starch is not chemically modified.

34. Starch product of claim 26 wherein the starch product has a size wherein at least 90% by weight of the particles pass through a 100 mesh U.S. Standard Screen without any grinding of the starch.

* * * * *

UNITED STATES PATENT AND TRADEMARK OFFICE
CERTIFICATE OF CORRECTION

PATENT NO. : 4,280,851
DATED : July 28, 1981
INVENTOR(S) : Pitchon et al.

It is certified that error appears in the above-identified patent and that said Letters Patent are hereby corrected as shown below:

Column 3 line 14, delete "an preberably" and add
-- and preferably --

Column 3, line 41, delete "granulating" and add -- gelatinizing --

Column 4, line 63, delete "fluid " and add -- liquid --

Column 6, line 58, before 'second' add -- a --

Column 9, line 33, after 'is' add -- a --

Column 12, line 7, delete "an" and add -- and --

Signed and Sealed this

Tenth Day of November 1981

[SEAL]

Attest:

GERALD J. MOSSINGHOFF

Attesting Officer    Commissioner of Patents and Trademarks